United States Patent Office 3,405,482
Patented Oct. 15, 1968

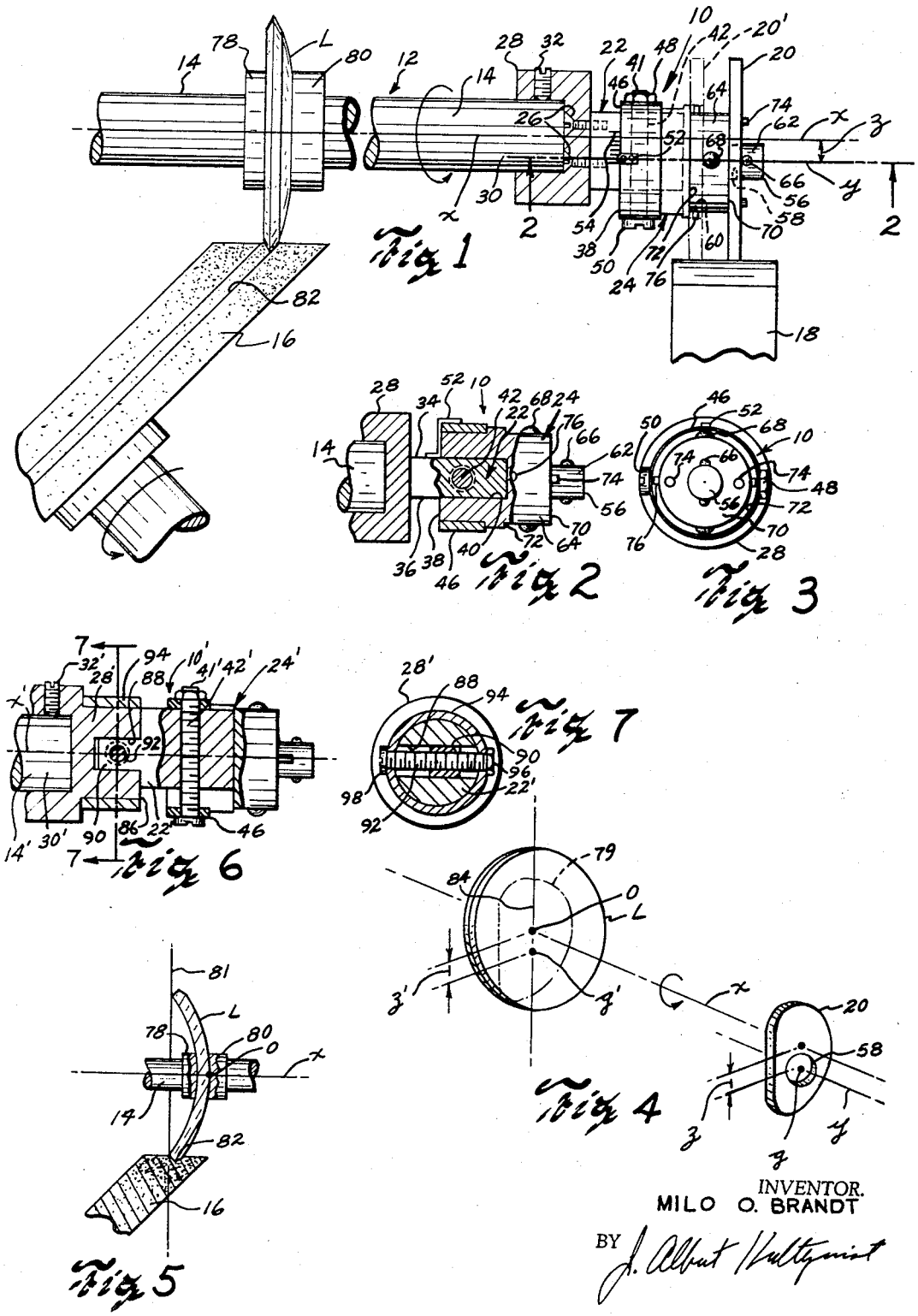

3,405,482
PATTERN HOLDER FOR EDGING MACHINES
Milo O. Brandt, Sturbridge, Mass., assignor, by mesne assignments, to American Optical Company, Southbridge, Mass., a corporation of Delaware
Filed Nov. 24, 1965, Ser. No. 509,592
5 Claims. (Cl. 51—101)

ABSTRACT OF THE DISCLOSURE

The combination in a lens edge grinding machine of a lens holding arbor having a pattern holder at one of its ends. The pattern holder is adjustable to settings of geometrical concentricity and eccentricity with the axis of the arbor for effecting desired amounts of displacement of the geometrical center from the optical center of lenses ground by the machine when the lenses are held by the arbor with one of said centers in coincidence with the axis of said arbor.

---

This invention relates to improvements in pattern holders for lens edging machines.

In the art of edging ophthalmic lenses, it may be desirable to displace the geometrical centers of such lenses from their optical centers. For example, it may be that when two such lenses are mounted as a pair in a spectacle frame, it will be required that their optical centers be spaced from each other a distance equal to the correct interpupillary distance of the intended wearer regardless of the distance between the geometrical centers of the lens receiving openings in the frame. Such operation is commonly known as "decentering" the lens. Heretofore, this was accomplished by placing the intended geometrical center of a lens and a like geometrical center of a lens edging pattern both in coaxial relationship along the axis of rotation of a lens supporting arbor in an edging machine. Thus, the optical center of the lens became displaced laterally from its geometrical center by the amount required to ultimately locate the optical center forwardly of the center of the eye when the finished lens was mounted in a position of use. Since, however, the optical center of a lens is normally located at the apex or crest of the curved side surface or face thereof which is clamped against an end of the edging machine arbor with its center of curvature coaxial with the arbor axis, the aforementioned technique of displacing the optical center from the axis of the arbor caused the plane in which the rim of the lens lies to become tilted relative to a plane normal to the axis of the arbor. Such tilting, accordingly, causes the edge of the lens to wobble or waver when rotated. The tilting and attending wobble (i.e. lateral oscillation or wavering of the edge of the lens) depends upon the steepness of curvature of the faces of the lens and the amount to which the optical center is offset from the axis of the supporting arbor. However, lens wobble, even to the slightest degree, is troublesome particularly in bevel edging operations where the edge of a lens being rotated must run true, or nearly so, in order to contiuously engage and maintain a desired centered relationship with the bevel-forming groove in an edging machine wheel or cutter.

An object of the present invention is to uniquely, more simply and efficiently decenter ophthalmic lenses in lens edge grinding or cutting operations according to the requirements of ophthalmic prescriptions for adapting such lenses to their intended mountings.

To attain the aforesaid object and others which may appear from the following detailed description, in accordance with principles of my invention, I provide a pattern holder which is usually mounted on and synchronously rotated with a lens supporting arbor of a lens edge grinding or cutting machine. Such arbor is usually driven by an electric motor. The holder detachably receives exchangeable patterns such as are used conventionally for camming a lens, as it is rotated, toward and away from a grinding wheel or cutter by precontrolled amounts according to the size and shape desired of the lens.

With my pattern holder the problems attending lens wobble are eliminated in that all lenses to be edged are mounted perpendicularly to the axis of the lens edging machine arbor (i.e. with their optical centers concentric therewith). The pattern receiving portion of the pattern holder is rendered laterally adjustable so that decentration is effected by off-setting the pattern rather than the lens relative to the axis of rotation of the arbor. The lenses, accordingly, run true on the edging machine arbor so that accurate control of the position of a bevel produced on edges thereof is readily accomplished while optical center decentration is automatically effected to the extent required as a result of the aforementioned decentration of the edging pattern.

The present invention will be more fully understood by reference to the following detailed description which is accompanied by a drawing in which:

FIG. 1 illustrates, in elevation, a fragmentary view of a bevel-edging machine containing an embodiment of the present invention;

FIG. 2 illustrates in cross-section and partly in elevation the improved pattern holder of my invention wherein the cross-sectional part thereof is taken generally along line 2—2 of FIG. 1;

FIG. 3 is an end view of the pattern holder;

FIG. 4 diagrammatically illustrates principles of the invention;

FIG. 5 is a fragmentary vertical cross-sectional view of lens edging apparatus wherein principles of the invention are further illustrated;

FIG. 6 illustrates, partly in cross section and partly in elevation, a modified form of the invention; and FIG. 7 is a transverse cross-sectional view of the latter form of the invention taken along line 7—7 of FIG. 6.

Referring now to FIG. 1, there is shown pattern holder 10 applied to an exemplary lens edging machine 12. Edging machine 12, being typical of those commonly used in the field, is illustrated only to the extent of a fragmentary showing of its two piece lens supporting arbor 14, grinding wheel 16 and pattern shoe 18.

The edging of lenses to a desired contour shape and size is accomplished by clamping a lens L between the two parts of arbor 14 and rotating the lens and arbor as a unit about its axis while simultaneously moving the unit toward and away from wheel 16 under the control of an exchangeable cam or pattern 20. Pattern 20 is carried by my improved holder 10 at one end of arbor 14. In rotating with arbor 14, pattern 20 limits the extent of movement of lens L toward grinding wheel 16 by engaging shoe 18. Shoe 18 is preset relative to the portion of grinding wheel 16 which is contacted by lens L at a level selected according to the size to which lens L is intended to be edged. In an edging machine of the type illustrated in FIG. 1, elevation of shoe 18 increases the size to which lens L is edged and lowering of shoe 18 has the effect of decreasing the size of lens L. The peripheral shape of pattern 20 determines the ultimate peripheral shape imparted to lens L.

Those interested in more complete details of lens edging machines of the type generalized hereinabove and their operation may obtain same by reference to U.S. Patent No. 2,674,068. In said patent, however, the holder for receiving exchangeable lens patterns is conventional in that its pattern receiving hub is immovably fixed upon one end of the machine's lens supporting arbor.

My improved pattern holder 10 comprises, as shown in FIGS. 1 and 2, main body member 22 and adjustable pattern receiving hub 24. Body member 22 is fixed, as by means of screws 26 and/or by welding, to adaptor 28 which, in turn, is fitted upon end 30 of shaft 14 and secured thereto with one or more set screws 32. Adaptor 28 serves only as intermediary means for attaching pattern holder 10 to arbor 14 and, accordingly, may be modified to meet particular requirements for adapting the pattern holder to edging machine arbors of various types and forms other than that exemplified herein. Alternatively, body member 22 of pattern holder 10 may be attached directly to arbor 14 or it may be formed as an integral extension of arbor 14.

Body member 22 is generally rectangular in shape having oppositely disposed parallel sides 34 and 36 (see FIG. 2) serving as ways across which hub 24 is arranged to slide. Slot 40 extends diametrically across end 38 of hub 24 and, acting as a guideway, receives body member 22 with an intimate sliding fit. Threaded through body member 22 is adjusting screw 42 having its opposite ends each journaled to rotate in retaining ring 46. Ring 46 is press fitted, welded or otherwise immovably secured to end 38 of hub 24. Heads 48 and 50, one of which may be a nut threated upon end 41 of screw 42 (see FIG. 1), prevent longitudinal movement of the screw in ring 46. Slot 40 is longer than the width of body member 22 so that sliding adjustment of hub 24 to preselected settings of offset relationship with axis $x$ of arbor 14 may be accomplished by rotating screw 42. Screw 42, in being advanced or retracted in body member 22, carries with it hub 24. In order to facilitate the making of such adjustment, head 50 is slotted so as to receive a screw driver or suitable actuating tool. Pointer 52 carried by hub 24 registers against scale 54 the extent of lateral adjustment of hub 24 relative to axis $x$ of arbor 14. Scale 54 is scribed upon or otherwise applied to body member 22.

End 56 of hub 24 detachably receives, in conventional fashion, either an exchangeable lens edging pattern such as pattern 20 or a pattern such as pattern 20' which is illustrated by dot-dash outline in FIG. 1. In the field, edging machine patterns are supplied by ophthalmic lens and frame manufacturers usually in one or the other of the two herein exemplified forms. Patterns such as pattern 20 have a relatively small opening 58 extending therethrough and patterns such as pattern 20' have a larger but similar opening 60. Openings 58 and 60 are located concentrically with the geometrical centers of the respective patterns.

Shouldered portion 62 of hub 24 receives patterns such as 20 and shouldered portion 64 receives patterns such as 20' with the geometrical center of whichever type of pattern is selected for use being automatically positioned in concentric relationship with axis $y$ of hub 24. Ball detents 66 or 68 over which the patterns are snapped when applied to hub 24 detachably hold the patterns securely against shoulders 70 and 72 respectively. Pairs of locating pins 74 and 76 are received one in each of a set of openings provided therefore in the respective patterns 20 or 20' and thus key the patterns to hub 24.

Greater detail regarding the use of patterns and pattern adaptors of the aforementioned character may be obtained by referring to the previously mentioned U.S. Patent No. 2,674,068 and/or U.S. Patent No. 3,119,206.

The edging of an ophthalmic lens L according to principles of the present invention is accomplished by clamping the lens in arbor 14 with its optical center O placed concentrically upon axis $x$ of arbor 14 as diagrammatically allustrated in FIG. 4. This may be accomplished in a number of different ways such as by manually centering the lens between a pair of clamping pads 78 and 80 on arbor 14 or by previously moulding, cementing or otherwise attaching a block to a side of the lens in centered relationship with its optical center and, in turn, adapting the block to the edging machine arbor 14. The aforementioned techniques of placing lenses in a predetermined centered relationship in lens edging machine arbors are all commonly used and well understood in the field and, acordingly should not require further discussion herein.

Lens L, FIGS. 1 and 4, requiring decentration (i.e. that its final peripheral shape be formed about a geometrical center thereof which is displaced laterally from the optical center of the lens) is so formed by adjusting hub 24 of pattern holder 10 laterally on body member 22 to a setting where axis $y$ of hub 24 is offset relative to axis $x$ of arbor 14 by the amount $z$ (see FIGS. 1 and 4). Thus, when lens L, arbor 14, holder 10 and pattern 20 are rotated as a unit and lens L is presented to grinding wheel 16 as described hereinabove, its edge will become ground to the peripheral shape illustrated by dotted outline 79 in FIG. 4. Pattern 20, having its goemetrical center $g$ offset by distance $z$ from axis $x$, accordingly causes lens L to be formed with the geometrical center $g'$ of its final peripheral shape 79 offset from optical center O by the amount $z'$ equal to distance $z$.

In edging lenses as just described, distance $z$ is determined according to prescribed requirements for fitting a lens in its intended mounting (a spectacle frame) so that, regardless of the shape and size of the lens, its optical center will be positioned forwardly of the center of the eye, when the lens and mounting are in a position of use. Accordingly, distance $z$ is equal to one half the difference between the interpupillary distance of the intended wearer and the geometrical center-to-geometrical center distance between the pair of lens receiving openings in the mounting.

Since the optical center O of an ophthalmic lens is normally located at the apex or crest of its convex curved side surface, a lens positioned with its optical center coincident with the axis of arbor 14, as contemplated herein, automatically becomes disposed substantially parallel to a plane represented by line 81 which is perpendicular to axis $x$ of arbor 14 (see FIG. 5). Thus, when the lens and arbor are rotated in unison, the lens will run true, i.e. its edge will not waver appreciably relative to a groove such as 82 in grinding wheel 16 which may be employed to produce a bevel on the edge of the lens. Accordingly, positive control of the position of a bevel on the edge of the lens can be readily acomplished without the previously encountered problems of edge wavering. At the same time, the aforementioned optical center decentration of the lens is produced by the offset relationship of pattern 20 relative to axis $x$ about which the lens and pattern are both rotated.

The decentration of ophthalmic lenses in edging operations usually only involves locating the optical center O of a lens in spaced relationship with its geometrical center $g'$ along a horizontal meridian 84 (see FIG. 4) of the lens. However, there are occasions when it is desirable to not only displace the optical center of a lens along meridian 84 but to also displace the optical center slightly above or below meridian 84. One reason for this being to introduce what is referred to in the art as a slight amount of "prism" into the patient's prescription. This is accomplished by so positioning the optical center of the lens that the patient's visual axis for straight ahead viewing passes through the lens either slightly above or slightly below the optical center of the lens when the lens is in a position of use.

Accordingly, in FIGS. 6 and 7, there is illustrated a modification of the invention comprising pattern holder 10', which is constructed and arranged so that pattern receiving hub 24' is universally laterally adjustable relative to axis $x'$ of arbor 14'. Pattern holder 10' includes body member 22' upon which hub 24' is laterally adjustable relative to axis $x'$ of arbor 14' in one direction. Hub 24' and the portion of body member 22' received therein are identical in construction to the above-described corresponding parts of pattern holder 10. Thus, lateral adjustment of hub 24' in the said one direction is effected by operation of adjusting screw 42'. Lateral adjustment of pattern holder 10' in a direction normal to said one direction, however, is provided for in the construction of adaptor 28' which, in receiving body member 22', supports pattern holder 10' upon arbor 14'.

Adaptor 28' is fitted upon end 30' of arbor 14' and secured thereto with one or more set screws 32'. End 86 of adaptor 32' is slotted across a diameter thereof to form guideway 88. Within guideway 88, end 90 of body member 22' is intimately fitted as a slide. Adjusting screw 92 is threaded through end 90 of body member 22' and journalled at its opposite ends in retaining ring 94. Ring 94 is press fitted, welded or otherwise immovably fixed upon adaptor 28'. Heads 96 and 98 on opposite ends of screw 92 prevent longitudinal movement of the screw in ring 94 so that rotation of screw 92 causes body member 22' to threadedly advance along the screw. Thus, rotation of screw 92 effects decentration of hub 24' laterally relative to axis $x$ in a direction normal to the direction of the aforementioned adjustment which may be effected by operation of screw 42'.

I claim:

1. The combination in a lens edge grinding machine of an axially rotatable lens holding arbor and a pattern holder adjacent one end of said arbor wherein the improvement comprises:

said pattern holder having a main body member fixed to said arbor for rotation therewith;

an adjustable hub carried by said main body member for detachably receiving and supporting exchangeable lens edging patterns having their edges contoured to particular shapes desired to be imparted to lenses supported on said arbor; and means for selectively adjusting said hub in a direction across the axis of said arbor to settings of and away from axial coincidence with said arbor.

2. The combination according to claim 1 further including a shoe adapted to be engaged by respective edges of said patterns and a lens grinding wheel having its effective lens grinding surface disposed in a given relationship of level with that of said shoe whereby settings of said hub at axial coincidence with said arbor and in directions away from such coincidence will determine the extent of displacement of the geometrical center from the optical center of lenses ground by said machine when the lenses are held by said arbor with one of said centers in coincidence with the axis of said arbor.

3. The combination according to claim 2 wherein said means for selectively adjusting said hub includes a screw threaded through a portion of said main body member and having at least one of its ends journaled to rotate in said hub but fixed against longitudinal movement therein.

4. The combination according to claim 3 wherein said portion of said main body member is in the form of a slide and said hub has a slot extending diametrically thereacross acting as a slideway into which said slide is fitted.

5. The combination according to claim 4 wherein said main body member includes an adaptor section having one end attachable to said lens supporting arbor and having a slot extending diametrically across its opposite end;

there being a second slide on said main body member extending diametrically thereacross in right angularly disposed relationship with said portion forming said first mentioned slide, said second slide being fitted within said slot in said adaptor section; and a second screw threaded longitudinally through said second slide with at least one end thereof journaled for rotation in said adaptor section but fixed against longitudinal movement therein.

References Cited
UNITED STATES PATENTS

| | | | |
|---|---|---|---|
| 771,928 | 10/1904 | Persson | 74—600 |
| 782,440 | 2/1905 | Eberhardt | 74—600 |
| 2,674,068 | 4/1954 | Eves. | |
| 3,119,206 | 1/1964 | Baumgartner. | |

LESTER M. SWINGLE, *Primary Examiner.*

D. G. KELLY, *Assistant Examiner.*